United States Patent

Lin et al.

[11] Patent Number: 5,976,446
[45] Date of Patent: Nov. 2, 1999

[54] INJECTION MOLDING OF TRANSPARENT PLASTIC WITH GLITTER

[75] Inventors: Hsyu Zhen Lin, Feng Yuan; Lung Pen Kuo, Zhang Hua; Shumin Chen, Taipen, all of Taiwan; Fangchi Lin, New York, N.Y.

[73] Assignee: Millenium Expressions, Inc., New York, N.Y.

[21] Appl. No.: 09/047,578

[22] Filed: Mar. 24, 1998

[51] Int. Cl.[6] .......................... B29C 45/46; B29K 105/30
[52] U.S. Cl. ................................ 264/328.14; 264/328.18
[58] Field of Search ........................... 264/328.1, 328.14, 264/328.17, 328.18; 524/441

[56] References Cited

U.S. PATENT DOCUMENTS 2,230,127  1/1941  Basler ................................ 264/331.11
5,804,315  9/1998  Takimoto et al. ....................... 524/441

OTHER PUBLICATIONS

Frados, Joes, Plastics Engineering Handbook of the Society of the Plastics Industry, Inc. 4th edition, pp. 26–28 and 838861, 1976.

Primary Examiner—Jill L. Heitbrink
Attorney, Agent, or Firm—Colucci & Umans

[57] ABSTRACT

A process for making a clear plastic consumer product having an even distribution of glitter particles throughout its volume, start by forming a dry mixture of particles of the plastic and the glitter particles. The glitter particles are uniformly mixed with the particles of plastic in the mixture. The mixture is supplied to a hopper of an injection molding machine and then passed from the hopper to a heated cylinder of the injection molding machine to heat and melt the mixture to form an injectable mass. The injectable mass is injected into a mold cavity having the shape of the consumer product and allowed to cool and harden into the consumer product in the mold cavity. The process ended by opening the mold cavity to remove the consumer product from the mold cavity.

3 Claims, 1 Drawing Sheet

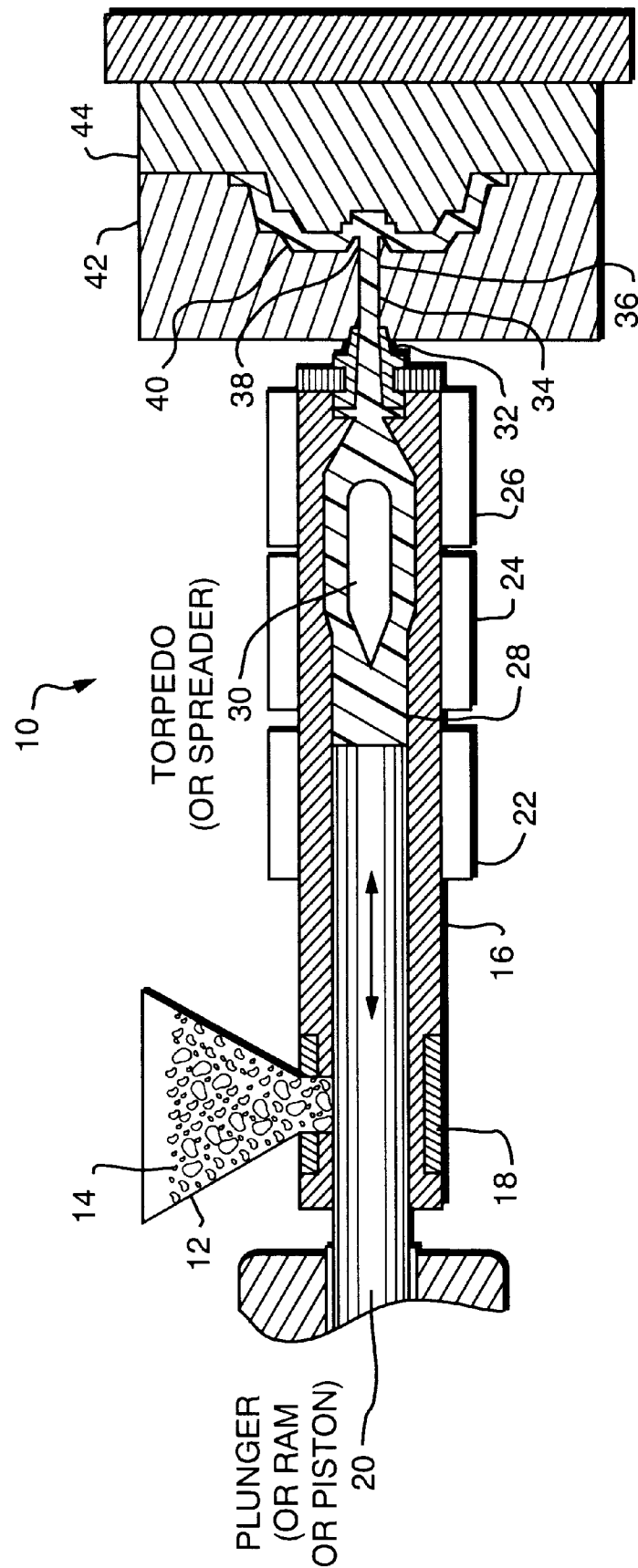

INJECTION MOLDING OF TRANSPARENT PLASTIC WITH GLITTER

FIELD AND BACKGROUND OF THE INVENTION

The present invention relates in general to an injection molding technique, and in particular to a new and useful method of manufacturing a clear plastic product which has an evenly distributed dispersion of glitter particles within the volume of the product.

There are various ways of shaping plastic to form consumer products. Among these, one of the most versatile techniques is injection molding. Injection molding is used for many thermosetting compounds and for almost all thermal thermoplastic compounds with few exceptions. During injection molding, a granular plastic is heated and forced through a heated cylinder. The melted hot mass is then injected into a closed mold cavity. After cooling, the plastic part is removed.

When it is desired to make a product from transparent plastic and have the final product transparent, care must be taken to insure that the conditions to which the plastic is subjected do not render the plastic opaque.

One of the present inventors has already developed a cast product which is transparent plastic and which includes glitter particles in the body of the product. Since cast products have many serious limitations, including the fact that at least one surface of the product must be flat and the process is not particularly suited to making three dimensional shapes, the present inventors determined that injection molding would be a preferred technique for making plastic products. It was not clear, however, how the glitter particles could be dispersed evenly through the volume of the product or if, in fact, this was possible at all.

SUMMARY OF THE INVENTION

An object of the present invention is to provide a method of manufacturing a plastic product which is clear and transparent, although it may have a color, but which most importantly contains an even distribution of glitter particles throughout the volume of the product.

Such a product has been found to be particularly attractive to younger consumers when embodied in personal care products such as combs, brushes, mirror frames, wastepaper baskets, facial tissue dispensers, storage baskets and the like.

According to the present invention, such a consumer product is manufactured by injection molding a dry mixture of plastic particles with the glitter particles and then supplying the dry mixture to the hopper of an injection molding machine which subjects the particles to heating, thereby melting the plastic particles and automatically forming an even distribution of glitter particles, and then injecting the mass into an injection mold.

It was found that by starting with the dry mixture of plastic and glitter, the final product would remain clear and still contain an even distribution of the glitter particles without the particles accumulating in uneven clumps at any particular location or surface of the final product.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only drawing in the disclosure is a schematic representation of an injection molding machine used to practice the present invention.

DESCRIPTION OF THE PREFERRED EMBODIMENTS

Referring to the drawing in particular, the invention illustrated therein comprises a process for making a clear plastic product containing an even and uniform distribution of solid, shiny glitter particles, using an injection molding machine generally designated 10, comprising a hopper 12 which contains a dry mixture 14 of plastic granules of the desired thermal plastic or thermal setting material, into which is evenly distributed glitter particles. Advantageous plastic particles are polystyrene, acrylic or AS (acrylonitrile styrene) mixtures of plastic, mixed with glitter particles of different sizes, for example granulated aluminum particles which are silver or have a color. Using known technology, any color can be applied to the silver particles by vapor deposition or other suitable process for depositing a thin film of color on to the particles without reducing their shininess or glitter quality.

By mixing the dry plastic particles with dry glitter particles, a uniform mixture can be created which avoids settling or other phenomenon which would cause the glitter particles to gather or clump and thus produce a final product having an uneven distribution of glitter particles.

According to the present invention, the uniform dry mixture 14 in hopper 12 settles downwardly into a heated cylinder 16 in a cooling zone 18. A plunger such as a ram for piston 20 which may also be of the screw type, is inserted into cylinder 16, pushing the dry mixture through heated zones 22, 24 and 26 of cylinder 16 which, in the area of the heated zones, forms an injection chamber 28. According to one embodiment of the invention, a torpedo or spreader 30 is provided in the chamber 28 for diverting the flow of now liquid plastic, as it approaches a nozzle 32. The molten plastic passes a sprue 34 before entering runner 36 and being injected past a restrictive gate 38 before entering the mold cavity 40 defined between mold parts 42 and 44 which are held together under pressure.

The injection machine of the present invention is of the 10 to 20 watt type and uses "1 by 1" or "3 by 1" molds.

As noted above, the transparent plastic may be polystyrene, or acrylic, or as mixed with sparkling glitter. The plastic may be color or colorless, but it is essential that it be transparent to product a clear final product.

Injection temperatures of 165° to 220° C. with injection pressure of 40 to 70 lbs. per square inch.

Injection time is preferably 60 to 120 seconds.

Cooling times of 25 to 45 seconds are observed before the mold 42, 44 is opened to release the final product.

While a specific embodiment of the invention has been shown and described in detail to illustrate the application of the principles of the invention, it will be understood that the invention may be embodied otherwise without departing from such principles.

What is claimed is:

1. A process for making a clear plastic consumer product having an even distribution of glitter particles throughout its volume, comprising:

forming a dry mixture of particles of the plastic and aluminum glitter particles, the aluminum glitter particles being uniformly mixed with the particles of plastic in the mixture;

supplying the mixture to a hopper of an injection molding machine;

passing the mixture from the hopper to a heated cylinder of the injection molding machine to heat and melt the mixture to a temperature of 160° to 220° C. to form an injectable mass;

injecting the injectable mass into a mold cavity having the shape of the consumer product at a pressure of about 40 to about 70 lbs. per square inch;

allowing the mass that has been injected into the mold cavity to cool and harden for about 25 to 45 seconds into the consumer product in the mold cavity; and opening the mold cavity to remove the consumer product from the mold cavity.

2. A process according to claim 1 wherein the plastic particles are particles of polystyrene or acrylic or AS mixture.

3. A process according to claim 2 including injecting the injectable mass for a period of about 60 to 120 seconds.

* * * * *

UNITED STATES PATENT AND TRADEMARK OFFICE
CERTIFICATE OF CORRECTION

PATENT NO : 5,976,446
DATED : November 2, 1999
INVENTOR(S) : Hsyu Zhen Lin, et al.

It is certified that error appears in the above-identified patent and that said Letters Patent are hereby corrected as shown below:

Column 2, line 55, change "lbs. per square inch" to --MPa--.
Column 3, line 13, change "lbs. per square inch" to --MPa--.

Signed and Sealed this

Seventeenth Day of April, 2001

Attest:

NICHOLAS P. GODICI

Attesting Officer   Acting Director of the United States Patent and Trademark Office